(12) United States Patent
Basulto et al.

(10) Patent No.: US 10,627,706 B2
(45) Date of Patent: Apr. 21, 2020

(54) APPARATUS WITH ADJUSTABLE CHAMBER FOR DIFFERENT SIZED MOBILE DEVICES THAT PERFORM IMAGE CAPTURE

(71) Applicant: iOgrapher, LLC, San Gabriel, CA (US)

(72) Inventors: David Basulto, San Gabriel, CA (US); Dale Woiken, Upland, CA (US)

(73) Assignee: iOgrapher, LLC, San Gabriel, CA (US)

( * ) Notice: Subject to any disclaimer, the term of this patent is extended or adjusted under 35 U.S.C. 154(b) by 38 days.

(21) Appl. No.: 15/946,530

(22) Filed: Apr. 5, 2018

(65) Prior Publication Data

US 2018/0224726 A1    Aug. 9, 2018

Related U.S. Application Data

(63) Continuation-in-part of application No. 15/087,297, filed on Mar. 31, 2016, which is a continuation-in-part of application No. 13/895,349, filed on May 15, 2013, now Pat. No. 9,386,194.

(60) Provisional application No. 61/768,751, filed on Feb. 25, 2013.

(51) Int. Cl.
*H04N 5/225* (2006.01)
*G03B 17/56* (2006.01)

(52) U.S. Cl.
CPC ........ *G03B 17/563* (2013.01); *G03B 17/565* (2013.01); *H04N 5/2251* (2013.01); *H04N 5/2252* (2013.01); *H04N 5/2257* (2013.01); *H04N 5/22521* (2018.08)

(58) Field of Classification Search
CPC ........ A45C 11/0038; A45F 2200/0533; H04N 5/2252; H04N 7/183; H04N 7/185; G03B 17/08; B63C 11/48
See application file for complete search history.

(56) References Cited

U.S. PATENT DOCUMENTS

| | | | |
|---|---|---|---|
| 8,915,660 B1 * | 12/2014 | Ben Yehuda | F16M 11/041 396/420 |
| 9,503,627 B2 * | 11/2016 | Yang | H04N 5/23203 |
| 2012/0133758 A1 * | 5/2012 | Foss | G03B 17/08 348/81 |
| 2012/0228181 A1 * | 9/2012 | Damon | A45C 11/00 206/521 |
| 2013/0005401 A1 * | 1/2013 | Rosenhan | G06F 1/1626 455/557 |

(Continued)

OTHER PUBLICATIONS

Amzon.com Smartphone Video Rig with 3 Shoe Mounts Handheld Phone Stabilizer Handle Grip Tripod Mount Compatible with iPhone X 8 7 Plus Samsung (Year: 2017).*

*Primary Examiner* — Sinh Tran
*Assistant Examiner* — Selam T Gebriel
(74) *Attorney, Agent, or Firm* — Patent Ingenuity, P.C.; Samuel K. Simpson

(57) ABSTRACT

An apparatus has a left handle, a right handle, an adjustable chamber operably attached to the left handle and the right handle, and one or more adjustable members positioned within the adjustable chamber. The adjustable chamber receives a mobile computing device that performs image capture. Further, the one or more adjustable members retract so that the mobile computing device fits within the adjustable chamber.

15 Claims, 18 Drawing Sheets

(56) References Cited

U.S. PATENT DOCUMENTS

| | | | |
|---|---|---|---|
| 2014/0093229 A1* | 4/2014 | Lecuna Aguerrevere | ................... F16M 11/048 396/420 |
| 2014/0183238 A1* | 7/2014 | Lin | ........................ B60R 11/02 224/483 |
| 2015/0029604 A1* | 1/2015 | Chalenko | ............. G03B 17/566 359/813 |
| 2015/0201113 A1* | 7/2015 | Wood | ................... G03B 17/561 348/376 |
| 2015/0333789 A1* | 11/2015 | An | ....................... H04B 1/3877 455/575.9 |
| 2016/0033792 A1* | 2/2016 | Blum | ..................... G02C 11/10 348/294 |
| 2016/0131965 A1* | 5/2016 | Chalenko | ............. H04N 5/2254 359/812 |

\* cited by examiner

APPARATUS WITH ADJUSTABLE CHAMBER FOR DIFFERENT SIZED MOBILE DEVICES THAT PERFORM IMAGE CAPTURE

RELATED APPLICATIONS

This patent application is a Continuation-In-Part application of U.S. patent application Ser. No. 15/087,297, filed on Mar. 31, 2016, entitled APPARATUS FOR DIFFERENT SIZED MOBILE DEVICES THAT PERFORM IMAGE CAPTURE, which is a Continuation-In-Part application of U.S. patent application Ser. No. 13/895,349, filed on May 15, 2013, entitled RECEPTACLE FOR AN IMAGE CAPTURE COMPUTING DEVICE, and patented on Jul. 5, 2016 as U.S. Pat. No. 9,386,194, which claims priority to U.S. Provisional Patent Application Ser. No. 61/768,751, filed on Feb. 25, 2013, entitled A PLASTIC CASE FOR THE IPAD MINI AND IPAD. IT HAS HANDLES ON THE SIDES, 3 ACCESSORY SHOE AREAS, A TRIPOD MOUNT, AND THE ABILITY TO SCREW ON 37 MM LENSES., which are hereby incorporated by reference in their entireties.

BACKGROUND

1. Field

This disclosure generally relates to the field of image capture. More particularly, the disclosure relates to a configuration that receives different sized mobile computing devices that performs image capture.

2. General Background

Standard cameras typically allow for utilization of a tripod. For example, a photographer can place a standard camera on a tripod so that movement of the camera during image capture is minimized. The tripod allows a photographer using a standard camera to take pictures without using both hands to stabilize the camera.

Current mobile computing devices, e.g., tablet devices, smartphones, etc., provide image capture capabilities, e.g., still or motion, that are comparable with standard image capture devices such as standard cameras. Yet the picture quality from such mobile computing devices is often of a lesser quality than that of standard cameras as standard cameras provide users with firmer stabilization abilities than a mobile computing device. Users often have difficulty keeping the mobile computing device stable during image capture. The mobile computing device often wobbles during the image capture, which then results in pictures or videos that are often of a less than ideal quality.

SUMMARY

In one aspect of the disclosure, an apparatus is provided. The apparatus has a left handle, a right handle, an adjustable chamber operably attached to the left handle and the right handle, and one or more adjustable members positioned within the adjustable chamber. The adjustable chamber receives a mobile computing device that performs image capture. Further, the one or more adjustable members retract so that the mobile computing device fits within the adjustable chamber.

In another aspect of the disclosure, another apparatus is provided. The other apparatus has a handle, an adjustable chamber operably attached to the handle, and one or more adjustable members positioned within the adjustable chamber. The adjustable chamber receives a mobile computing device that performs image capture. The one or more adjustable members retract so that the mobile computing device fits within the adjustable chamber.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A receptacle for a computing device that performs image capture is provided. The image capture computing device is received by the receptacle. A user then grasps the receptacle and motions the receptacle to a position for image capture. The receptacle has handles that provide for stabilization of the receptacle and the image capture computing device. As a result, users performing image capture have the ability to capture still images and/or video images with stabilization. In contrast with heavy receptacles that do not have handles, the receptacle for the image capture computing device provides a lightweight configuration that provides stabilization for an image capture computing device.

Further, the receptacle is configured to provide optimal accessibility to various ports of the mobile computing device. In contrast with a configuration in which wires have to be bent in a manner that may damage the wires and be cumbersome for a user, the receptacle is configured to maximize accessibility to the mobile computing device and minimize interference from the wires.

In addition, the receptacle may have additional components that allow the user performing image capture to vary image capture conditions. For example, the receptacle may receive a variety of lenses that may be utilized to vary viewing conditions. Further, various lighting and/or audio equipment may be positioned on the receptacle to vary lighting and/or audio conditions. The receptacle may also have a tripod component so that the receptacle may be stabilized with a tripod to minimize motion of the image capture computing device during image capture.

Figure 1:
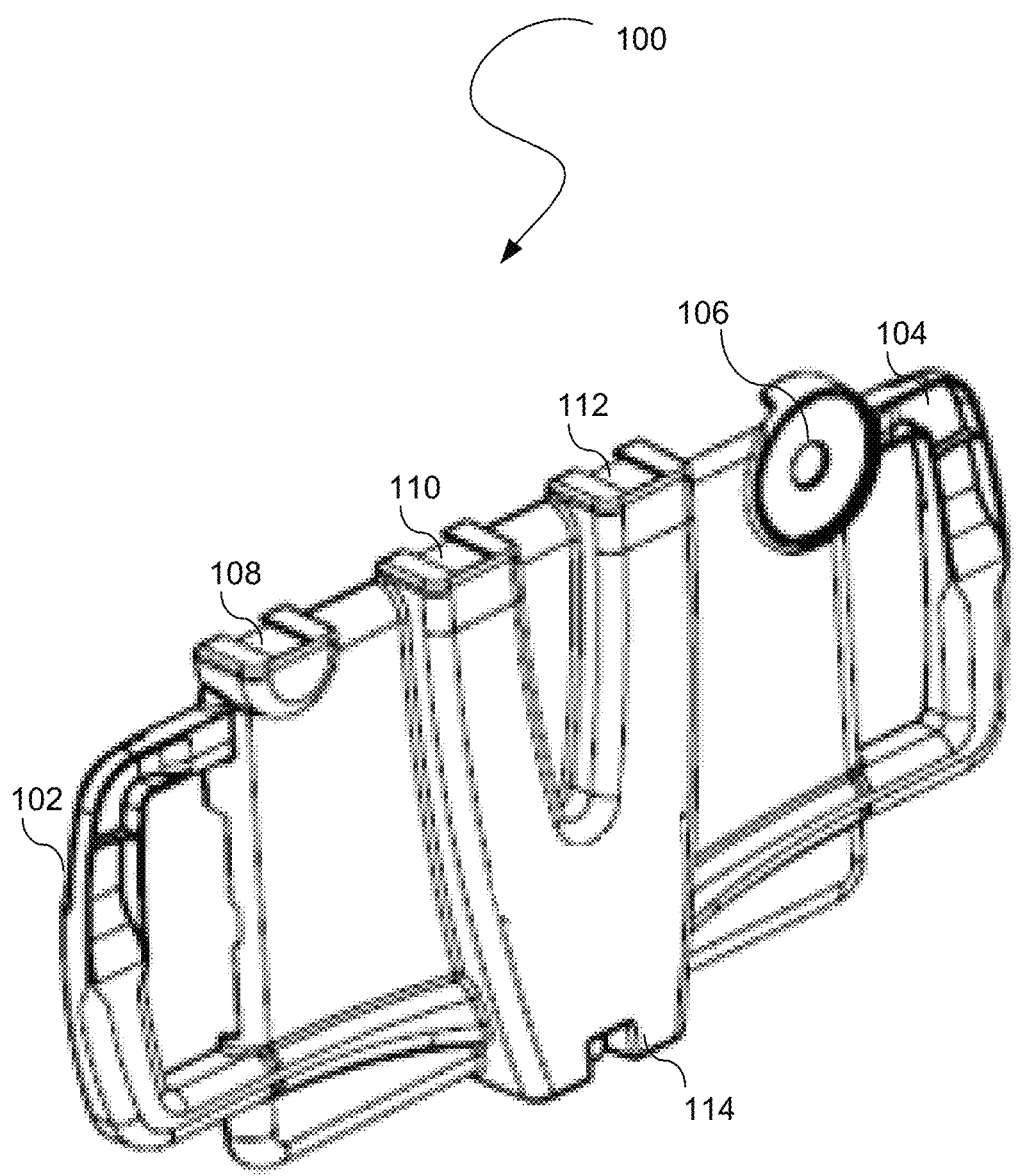
FIG. 1 illustrates a front view of an image capture computing device receptacle.

FIG. 1 illustrates a front view of an image capture computing device receptacle 100. In one embodiment, the image capture computing device receptacle 100 includes a plurality of handles, e.g., a right handle 102 and a left handle 104. The front of the image capture computing device receptacle 100 is illustrated from the perspective of what another user views if in front of the image capture computing device 100 when an image is captured by a user such as a photographer. The right handle 102 and the left handle 104 allow the user to perform image capture with minimal wobbling. As a result, the photographer is able to perform image capture with more stabilization and accuracy than without the image capture computing device receptacle 100. Although the right handle 102 and the left handle 104 are illustrated, the handles may be in other locations, e.g., a top handle and a bottom handle. Further, a single handle or more than two handles may be utilized. The right handle 102 and the left handle 104 are provided merely for illustrative purposes.

The image capture computing device receptacle 100 also has an aperture 106. The aperture 106 is configured so that an image capture component, e.g., a lens of a mobile image capture computing device, may be positioned to capture images through the aperture 106. In one embodiment, the aperture 106 is configured to be in substantial proximity to the image capture component. For example, the aperture may be narrow enough to only be positioned over the lens to minimize reflection.

In another embodiment, the image capture computing device receptacle 100 has a plurality of accessory receiving means. As an example, the image capture computing device receptacle 100 has a receiving means 108, a receiving means 110, a receiving means 112, and a receiving means 114. The various receiving means may be utilized to receive accessories such as lighting devices, e.g., lamps, audio devices, e.g., microphones, additional lenses, e.g., wide angle lenses, tripods, and/or the like. For example, the receiving means 114 may receive a tripod mount to provide further stabilization for the image capture computing device receptacle 100 with a tripod. A single or different quantity of receiving means may be utilized from that illustrated in FIG. 1.

In one embodiment, the right handle 102 and the left handle 104 are integrated within the same frame as the image capture computing device receptacle 100. In other words, a single molding may be utilized for the frame and the handles. In an alternative embodiment, the right handle 102 and the left handle are detachable from the frame.

Figure 2:
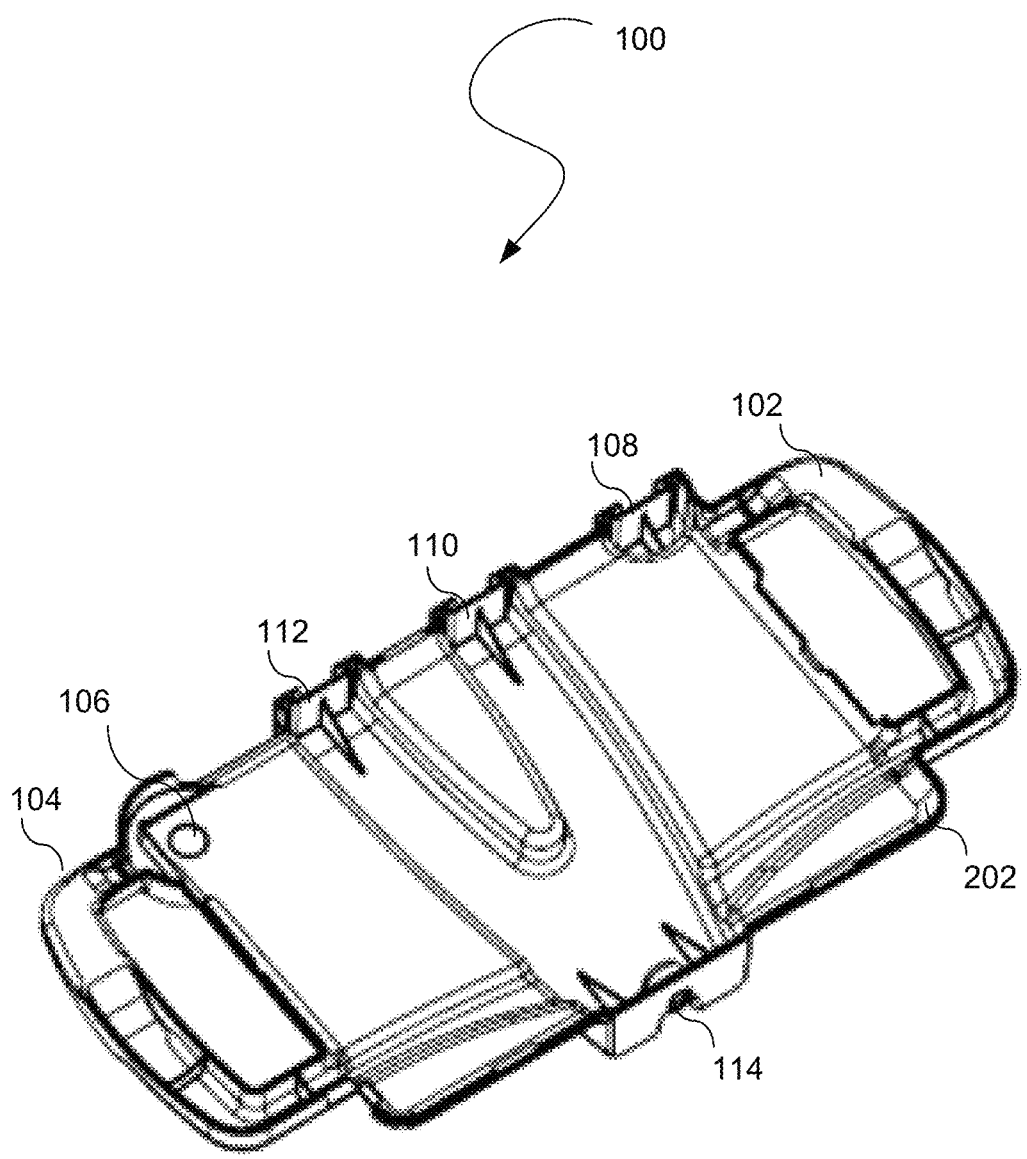
FIG. 2 illustrates a back view of the image capture computing device receptacle.

FIG. 2 illustrates a back view of the image capture computing device receptacle 100. The back view is from the perspective of the photographer that is placing the mobile computing device in the image capture computing device receptacle 100. In one embodiment, the image capture computing device receptacle 100 has a receiving means for receiving the image capture computing device receptacle 100. An example of the receiving means is the lip 202. The lip 202 may be positioned throughout all of the frame or at least a portion of the frame. A photographer may then snap the mobile computing device within the lip to secure the mobile computing device in the image capture computing device receptacle 100. As a result, the photographer may easily snap the mobile computing device into position. The lip is only an example of the receiving means. The receiving means may also be a fastening means such as a screw, bolt, nail, clip, and/or the like.

Figure 3:
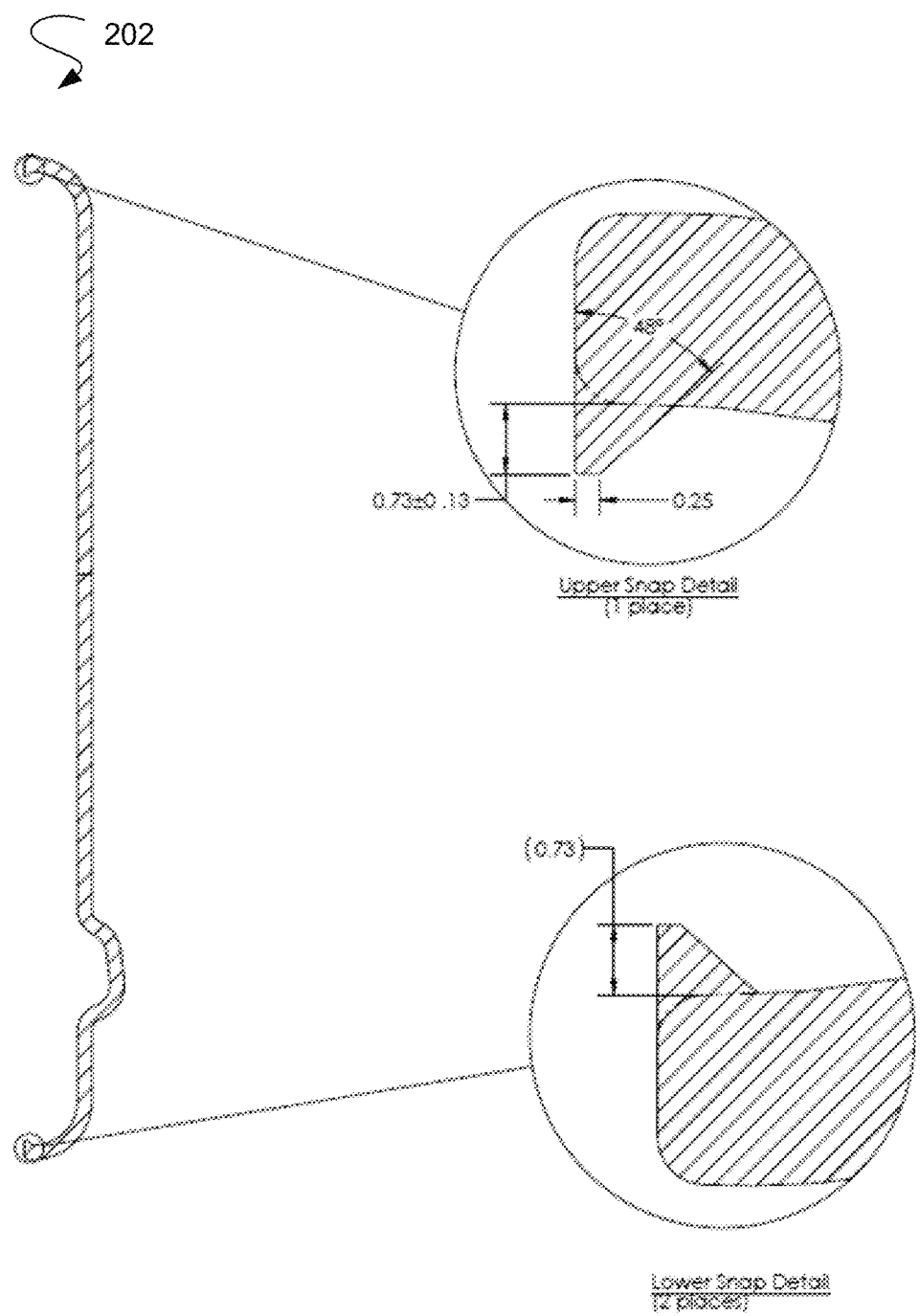
FIG. 3 illustrates a side view of the receiving means.

FIG. 3 illustrates a side view of the receiving means 202. The receiving means 202 is illustrated as a lip only for illustrative purposes as various other receiving means may be utilized.

Figure 4:
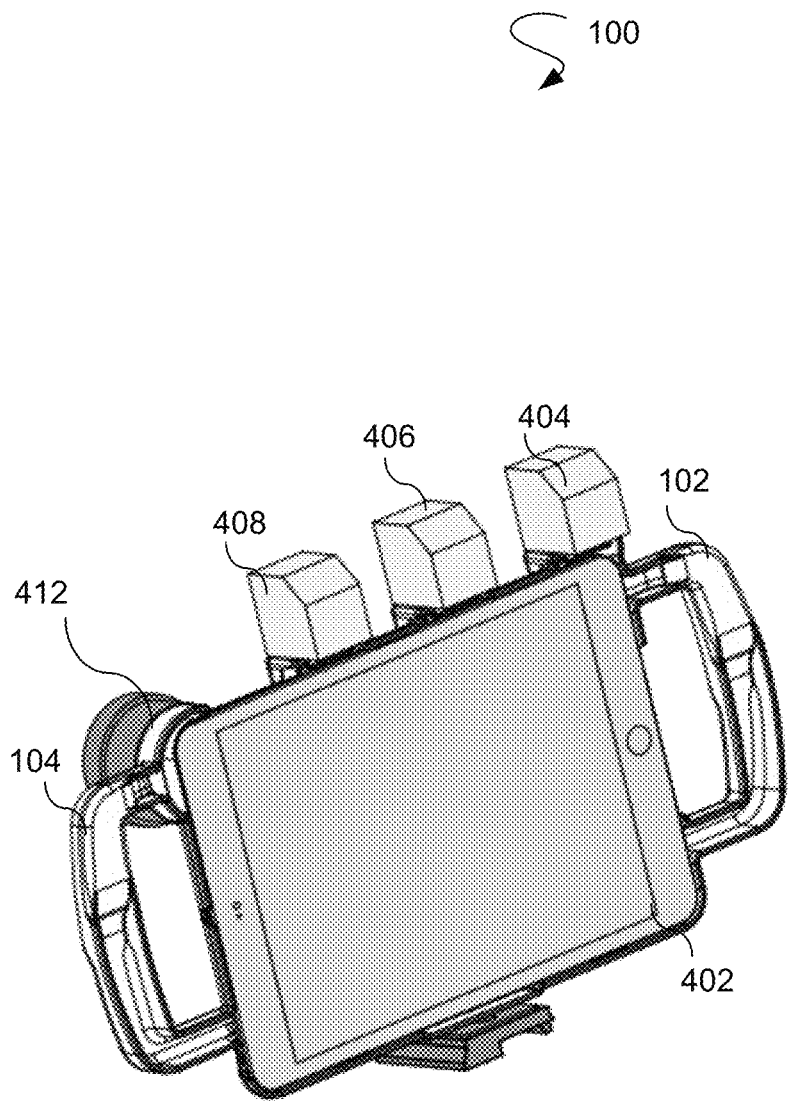
FIG. 4 illustrates a front view of the image capture computing device receptacle with a mobile computing device secured to the image capture computing device receptacle.

FIG. 4 illustrates a front view of the image capture computing device receptacle 100 with a mobile computing device 402 secured to the image capture computing device receptacle 100. The mobile computing device 402 may be a tablet device, smartphone, or any other mobile device. Further, the mobile computing device 402 may have an image capture component, e.g., a built in camera, for still or motion image capture. Various accessories 404, 406, and 408 may be connected to the receiving means 108, 110, and 112. The receiving means 108, 110, and 112 may be a lip, screw, bolt, nail, clip, and/or the like. Further, a lens accessory 412 is positioned over the aperture 106.

Although a frame single frame is illustrated in FIG. 4, multiple frames may alternatively be utilized to secure the mobile computing device 402. In other words, the image capture computing device receptacle 100 may comprise multiple parts such as a front portion and a back portion to secure the mobile computing device 402 to the image capture computing device receptacle 100. Accordingly, the image capture computing device receptacle 100 is not limited to a single frame as multiple frames may alternatively be utilized.

Figure 5:
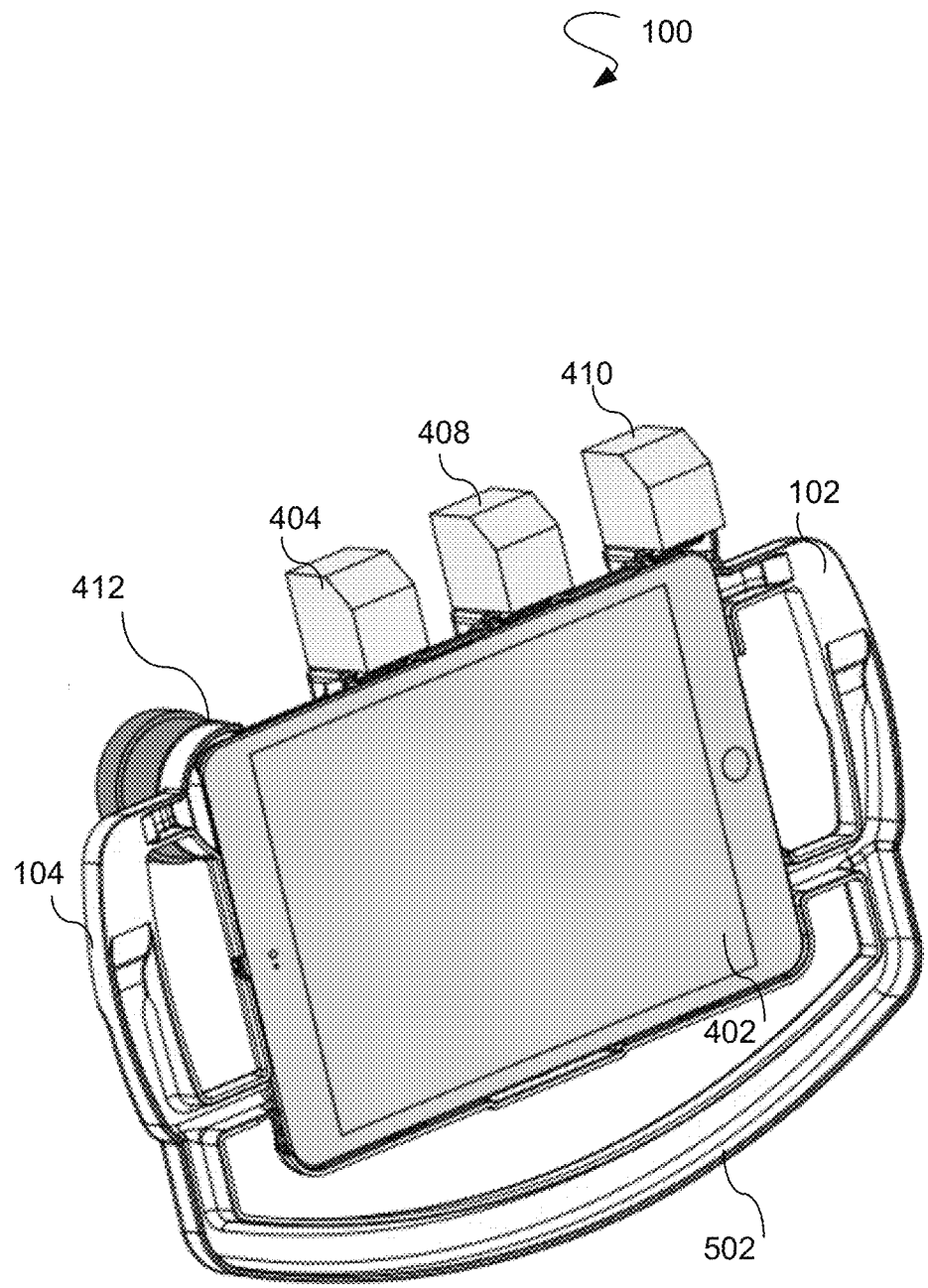
FIG. 5 illustrates a front view of the image capture computing device receptacle 100 with the mobile computing device secured to the image capture computing device receptacle and the image capture computing device receptacle having a bottom handle.

Although FIGS. 1-4 illustrated two handles, a single handle or more than two handles may be utilized. FIG. 5 illustrates a front view of the image capture computing device receptacle 100 with the mobile computing device 402 secured to the image capture computing device receptacle 100 and the image capture computing device receptacle 100 having a bottom handle 502. Alternatively, the right handle 102, the left handle 104, and the bottom handle 502 may be considered a single handle. Further, FIG. 6 illustrates a front view of the image capture computing device receptacle 100 with the mobile computing device 402 secured to the image capture computing device receptacle 100 and the image capture computing device receptacle 100 only having the left handle 104 for a handle.

Figure 6:
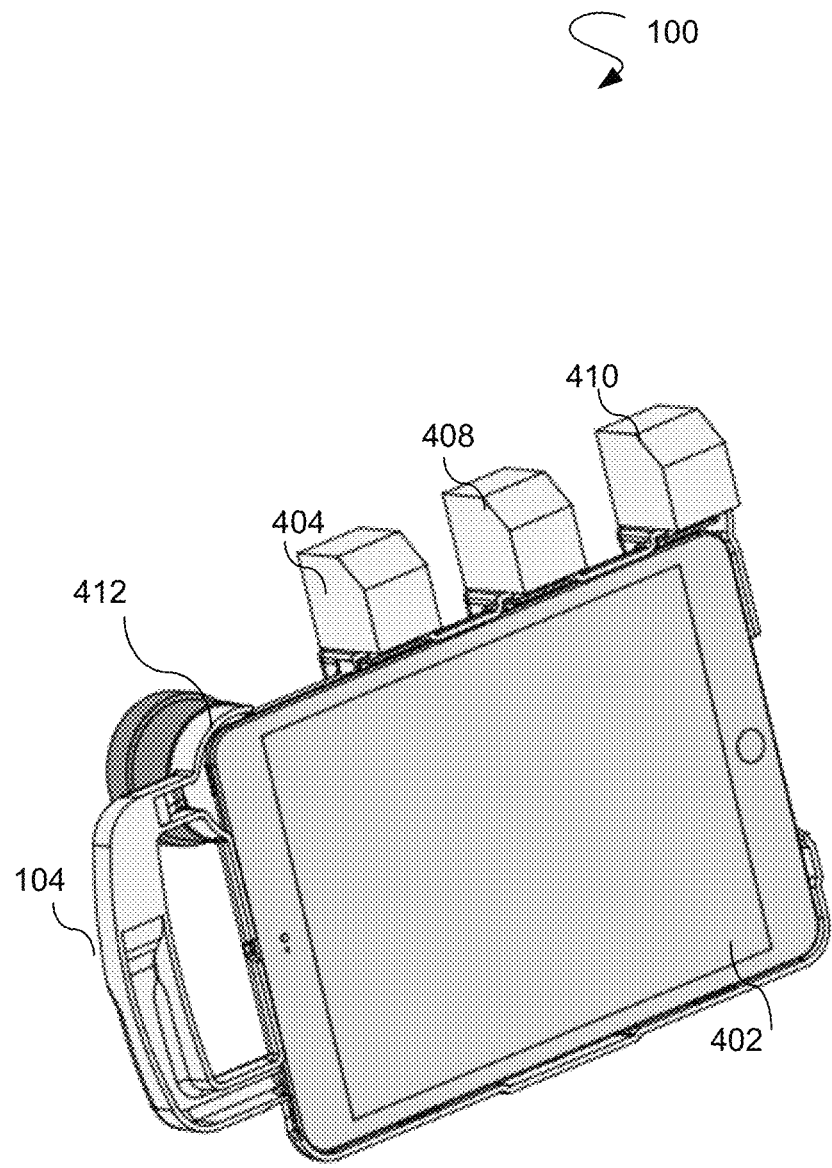
FIG. 6 illustrates a front view of the image capture computing device receptacle with the mobile computing device secured to the image capture computing device receptacle and the image capture computing device receptacle only having the right handle for a handle.
Figure 7:
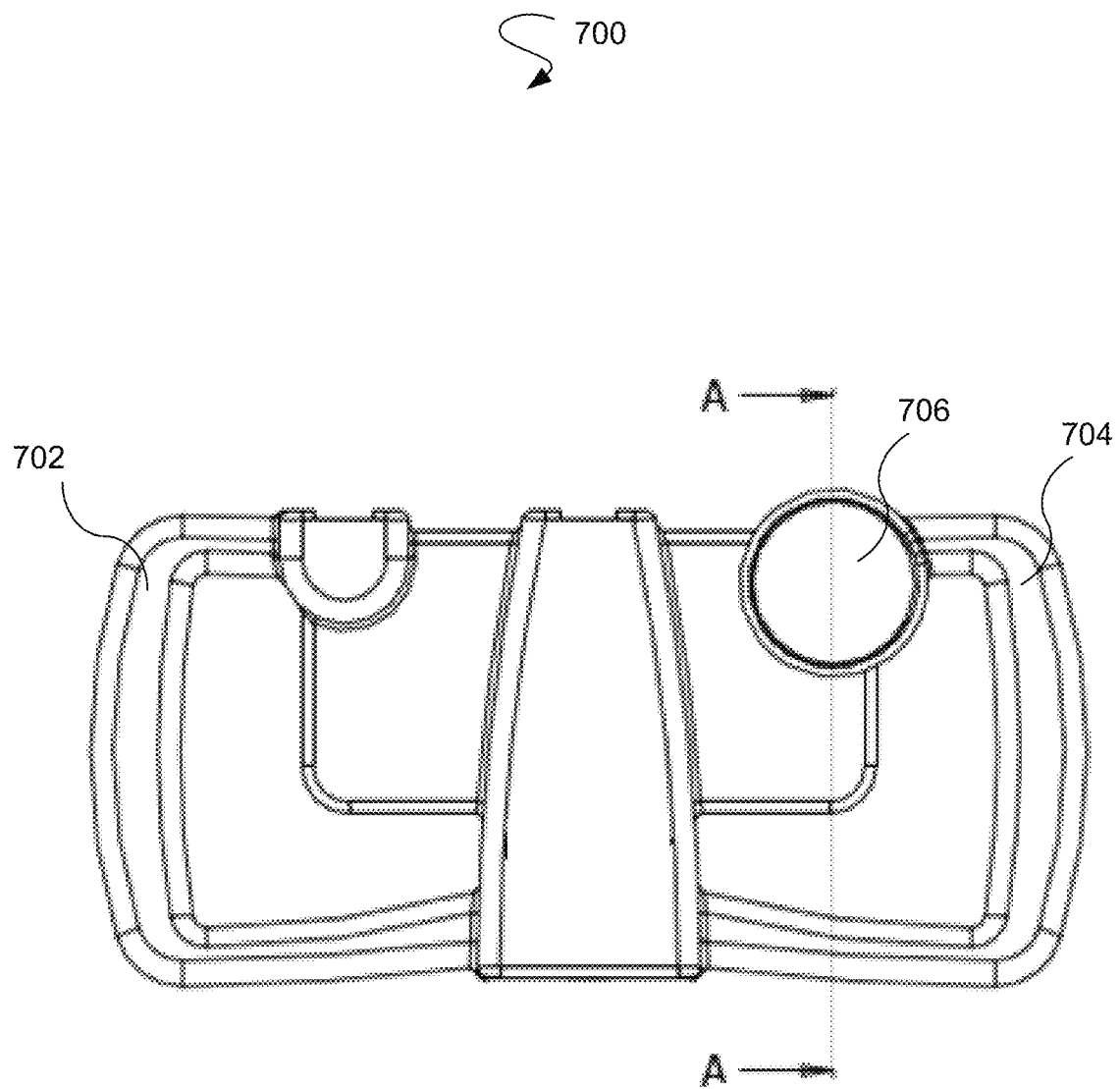
FIG. 7 illustrates a front view of an image capture computing device receptacle that is configured to receive a smartphone.
Figure 8:
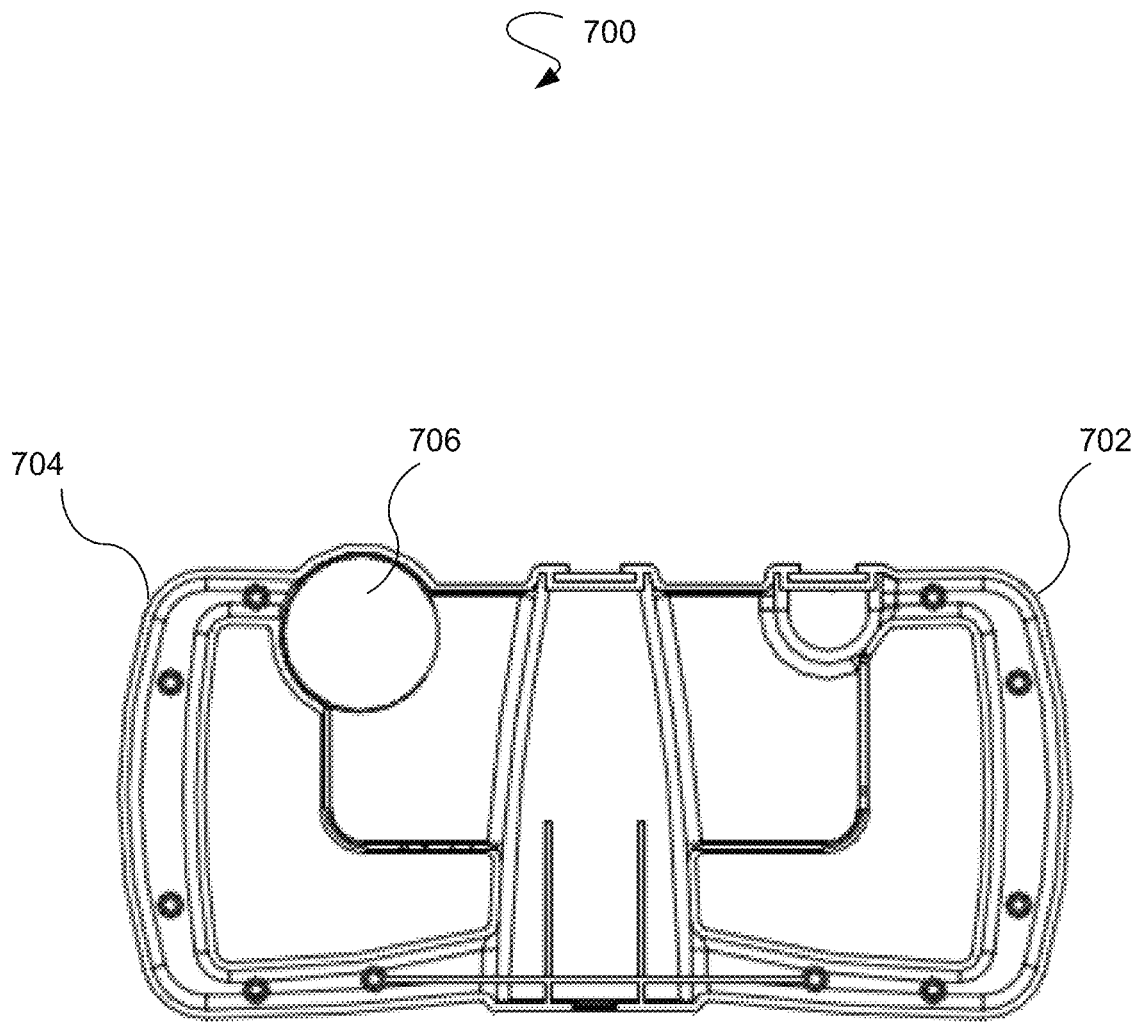
FIG. 8 illustrates a back view of the image capture computing device receptacle illustrated in FIG. 7.

Although FIGS. 4-6 illustrate the mobile computing device 402 as a tablet device, a smartphone may alternatively be utilized. Accordingly, FIG. 7 illustrates a front view of an image capture computing device receptacle 700 that is configured to receive a smartphone. The image capture computing device receptacle 700 has a right handle 702 and a left handle 704. The image capture computing device receptacle 700 also has an aperture 706. FIG. 8 illustrates a back view of the image capture computing device receptacle 700 illustrated in FIG. 7.

FIGS. 9A-9D illustrate various views of a flat handle configuration of the image capture computing device receptacle 100 illustrated in FIG. 1. The flat handle configuration has handles that are in vertical alignment with the vertical plane that goes through the image capture computing device receptacle 100. As a result various wires that are plugged into the mobile computing device 402 of FIG. 4 have to be bent, twisted, etc. to have accessibility to receiving ports of the mobile computing device 402 of FIG. 4. Such wires may be utilized to connect the image capture computing device 100 to various accessories, other devices, etc. The ports may be based on various technologies such as USB, Ethernet, etc.

Figure 9A:
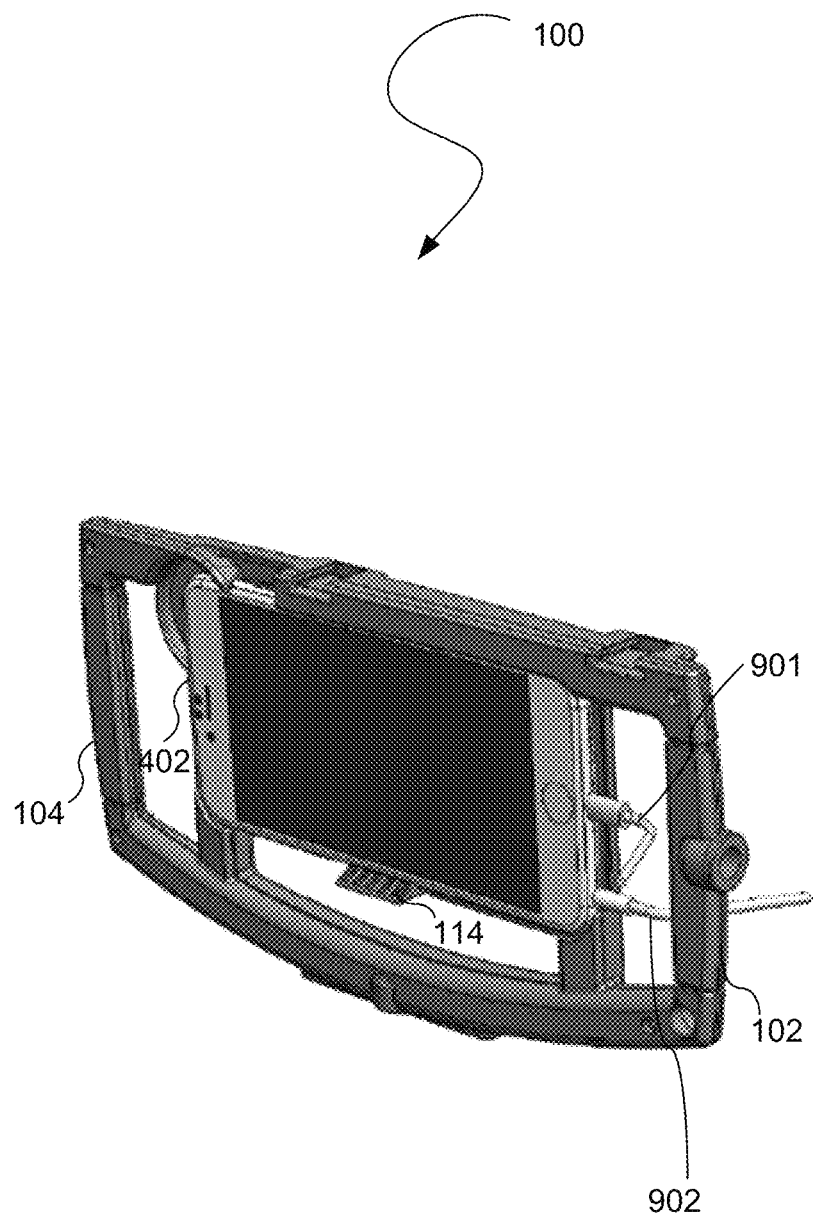
FIG. 9A illustrates a front perspective view of the flat handle configuration of the image capture computing device receptacle.

FIG. 9A illustrates a front perspective view of the flat handle configuration of the image capture computing device receptacle 100. The right handle 102 and the left handle 104 are in vertical alignment with the image capture computing device receptacle 100. As a result, a lighting cable 901 and a headphone cable 902 do not have direct accessibility to receiving ports of the mobile computing device 402. Therefore, the cables 901 and 902 have to be significantly bent, e.g., at approximate ninety degree angles, to obtain access to the receiving ports of the mobile computing device 402 of FIG. 4.

Such awkward bending may lead to significant damage or wear and tear of the cables 901 and 902. Further, the cables 901 and 902 may easily become unplugged from the receiving ports of the mobile computing device 402 of FIG. 4 as such bending does not allow for secure plugging of the cables 901 and 902. Such unplugging may lead to significant disruptions during filming, image capture, etc.

Further, the bending of the cables 901 and 902 interferes with a user's ability to comfortably grip the handles 102 and 104. For example, the bends of the cables 901 and 902 may occupy significant amounts of gripping space between the handles 102 and 104 and the portion of the image capture computing device receptacle 100 that encapsulates the mobile computing device 402. As a result, the bends of the cables 901 and 902 may block certain portions of the handles 102 and 104 from being gripped by the user.

Figure 9B:
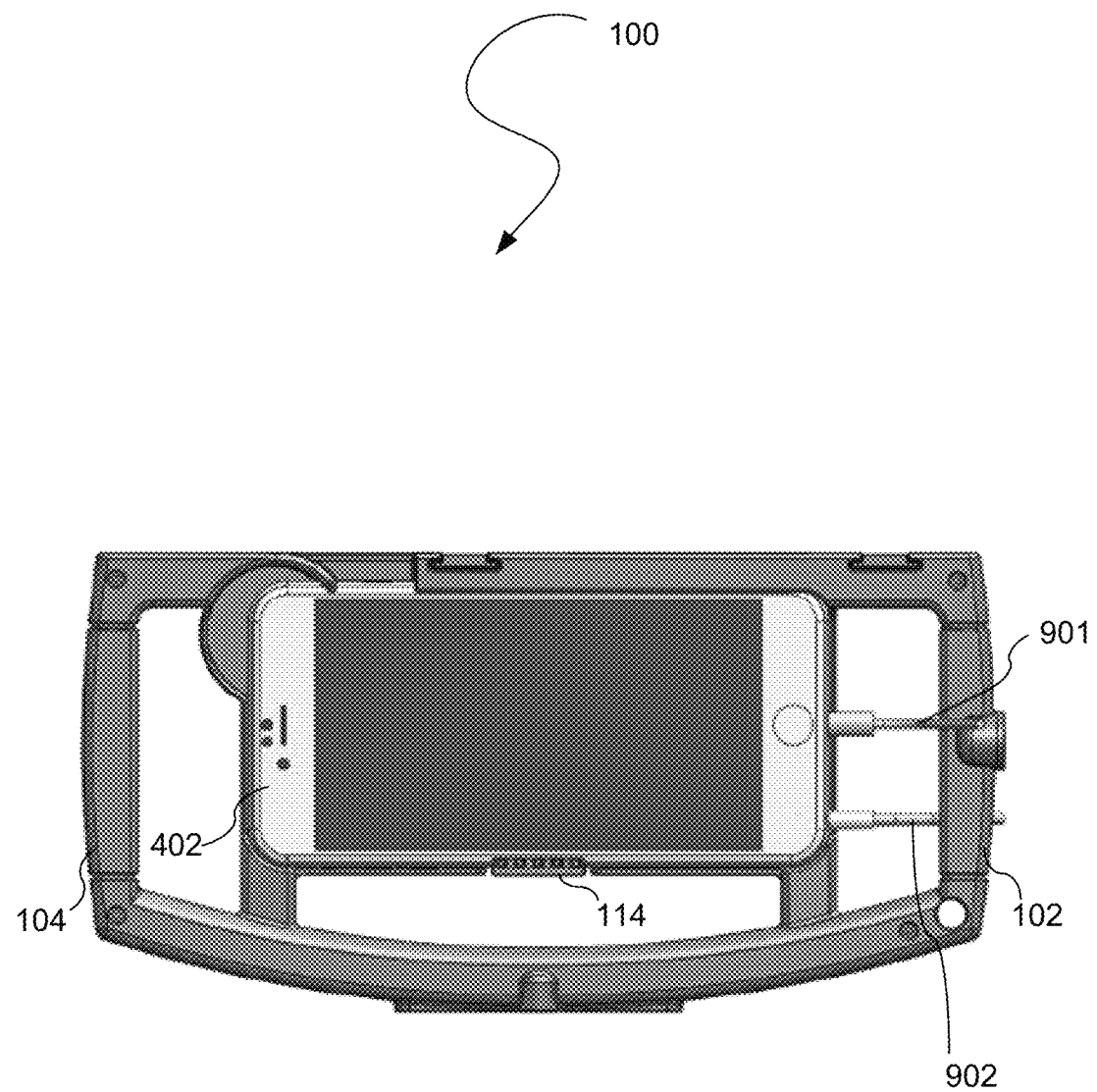
FIG. 9B illustrates a front view of the flat handle configuration of the image capture computing device receptacle illustrated in FIG. 9A.
Figure 9C:
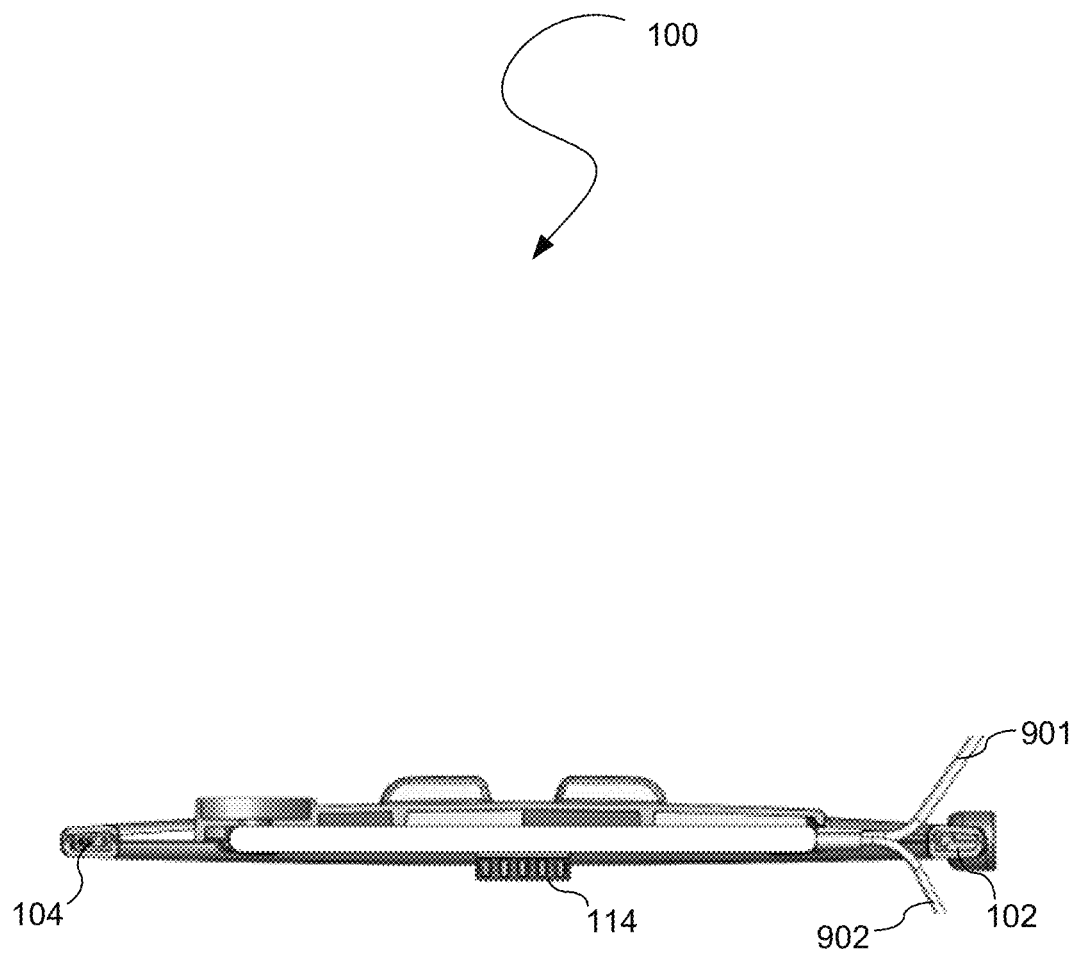
FIG. 9C illustrates a side view of the flat handle configuration of the image capture computing device receptacle illustrated in FIG. 9A.
Figure 9D:
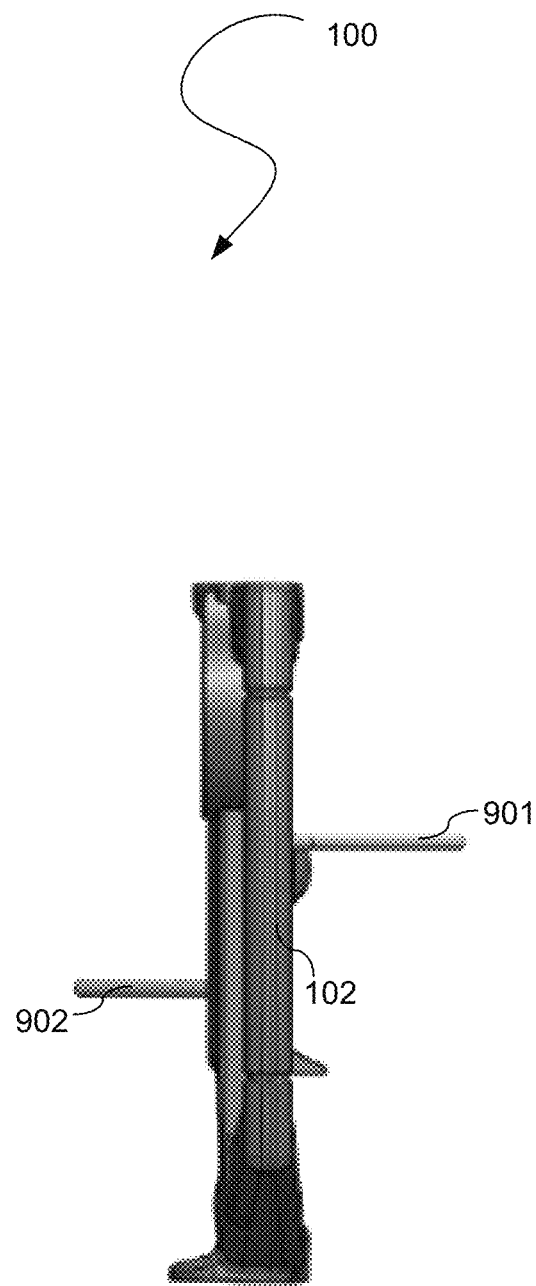
FIG. 9D illustrates another side view of the flat handle configuration of the image capture computing device receptacle illustrated in FIG. 9A.

FIG. 9B illustrates a front view of the flat handle configuration of the image capture computing device receptacle 100 illustrated in FIG. 9A. Further, FIG. 9C illustrates a side view of the flat handle configuration of the image capture computing device receptacle 100 illustrated in FIG. 9A. The cables 901 and 902 are illustrated as being significantly bent at almost ninety degree angles. In addition, FIG. 9D illustrates another side view of the flat handle configuration of the image capture computing device receptacle 100 illustrated in FIG. 9A.

The lighting cable 901 and the headphone cable 902 are only provided as examples of cables that may be utilized with the receiving ports of the mobile computing device 402. Other types of cables may also be utilized. Further, devices other than cables that may be received by the mobile computing device 402, e.g., USB devices, etc., may also be received by the receiving ports of the mobile computing device 402.

In yet another implementation, an apparatus has an adjustable chamber that accommodates different sized mobile computing devices 402 (FIG. 4). The adjustable chamber adjusts in size to fit the dimensions of a particular mobile computing device 402. Accordingly, the same apparatus may be utilized to perform image capture for different sized mobile computing devices 402 (e.g., different sized smartphones, tablet devices, etc.).

Figure 10:
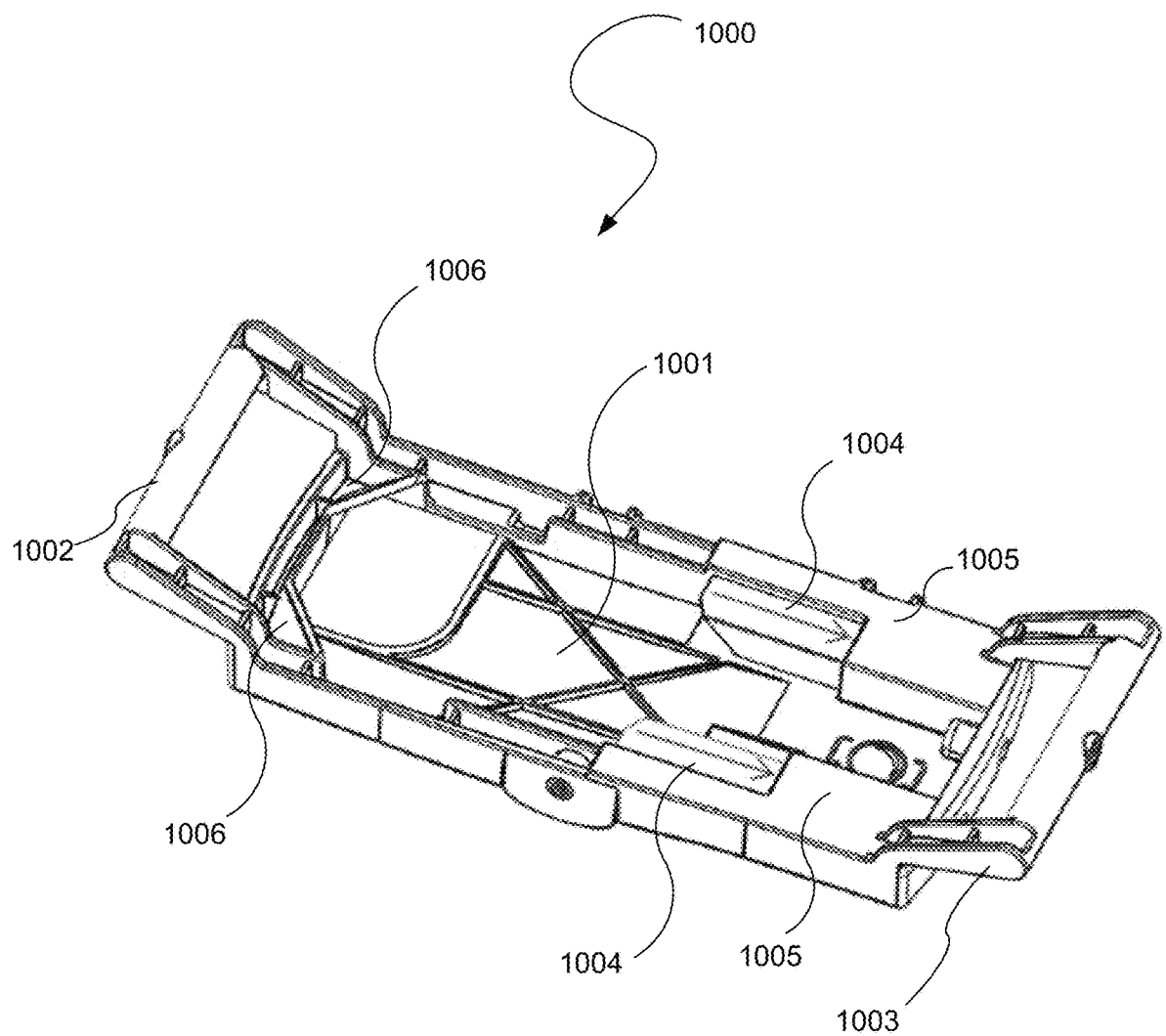
FIG. 10 illustrates a front perspective view of an apparatus with an adjustable chamber.

FIG. 10 illustrates a front perspective view of an apparatus 1000 with an adjustable chamber 1001. In one embodiment, the apparatus 1000 also has a left handle 1002 and a right handle 1003 that may be be utilized by a user to hold the apparatus 1000 to perform image capture with a mobile computing device 402 (FIG. 4) positioned within the adjustable chamber 1001.

In one embodiment, the adjustable chamber 1001 is adjusted via one or more adjustable members 1004. For example, two adjustable members 1004 may be perpendicularly situated with respect to the left handle 1002 and the right handle 1003; such adjustable members 1004 may also be positioned toward the right portion of the adjustable member 1001 to allow room for the mobile computing device 402 (FIG. 4) to be inserted from the left side of the adjustable chamber 1001. Further, the two adjustable members 1004 may be positioned at the top and bottom (from the orientation of being perpendicular to the handles 1002 and 1003), respectively, of the adjustable chamber 1001.

A mobile computing device 402 (FIG. 4) is inserted into the adjustable chamber 1001 by pressing an edge (e.g., bottom portion that is deemed a right portion when placed into the adjustable chamber 1001) of the mobile computing device 402 against edges of the two adjustable members 1004. The two adjustable members 1004 then adjust (e.g., slide, retract, compress, etc.) toward the right portion of the adjustable chamber 1001 until the opposing edge (e.g., top portion that is deemed a left portion when placed into the adjustable chamber 1001) of the mobile computing device 402 abuts firmly against the left portion of the adjustable chamber 1001.

As an example, a mobile phone 402 that is seven inches in length (measured from top to bottom) may necessitate that the two adjustable members 1004 adjust one half inch for the mobile phone 402 to firmly fit into the adjustable chamber 1001; whereas, another mobile phone 402 that is seven one half inches in length may necessitate that the two adjustable members 1004 adjust one inch for the mobile phone 402 to firmly fit into the adjustable chamber 1001.

In one embodiment, the width of the adjustable chamber 1001 is larger enough to accommodate the widest mobile computing device 402; as a result, space may be present between the edges of right and left (top and bottom when placed in the adjustable chamber 1001) sides of the mobile computing device 402 and edges of the adjustable chamber 1001. In other words, the adjustable members 1004 may apply enough horizontal pressure to the top or bottom portion (depending on the direction of insertion into the adjustable chamber 1001) so that the mobile computing device 402 remains firmly in place within the adjustable chamber 1001 without necessitating pressure from the top and bottom edges of the adjustable chamber 1001.

Further, in one embodiment, the adjustable members 1004, or portions thereof, are received within member enclosures 1005. For example, the adjustable members 1004 may have sliding grooves that contact sliding rails, or vice versa, within the member enclosures 1005 so that the adjustable members 1004 may slide, or partially slide, within the member enclosures 1005 to allow the mobile computing device 402 (FIG. 4) to fit within the adjustable chamber 1001. As another example, the adjustable members 1004 may be operably connected to one or more springs enclosed within the member enclosures 1005 so that the one or more springs compress as necessary to allow the mobile computing device 402 to fit within the adjustable chamber 1001.

Although the adjustable members 1004 are depicted in FIG. 10 as being a plurality, a single adjustable member 1004 may be used instead. Alternatively, more than two adjustable members 1004 may also be used.

To provide additional tightness to the fit of the mobile computing device 402 (FIG. 4) within the adjustable chamber 1001, two flaps 1006 may be positioned on the left side of the adjustable chamber 1001. For example, the two flaps 1006 may be positioned to enclose corners, or portions of corners, of the portion of the mobile computing device 402 positioned within the left side of the adjustable chamber 1001. In other words, the adjustable chamber 1001 may have a fixed receiving area (e.g., flaps 1006) and a dynamic receiving area (e.g., adjustable members 1004). Accordingly, a user may use an edge of a mobile computing device 402 to adjust the adjustable members 1004 via pressure and may use an opposing edge of the mobile computing device 402 to anchor the mobile computing device 402 within the flaps 1006.

The flaps 1006 may be composed of a rigid material (e.g., plastic) or a flexible material (e.g., rubber). Although more than one flap 1006 is illustrated, a single flap 1006 may be used instead (e.g., a single corner flap, an edge flap, etc.). The flaps 1006 may be flexible to allow for positioning of the mobile computing device 402 within the flaps 1006; alternatively, the flaps 1006 may be rigid. In another embodiment, a retention mechanism (e.g., a lip) other than a flap 1006 may be used to maintain the positioning of the edge of the mobile computing device that is opposite to the edge being positioned via the adjustable members 1004.

In yet another embodiment, at least one adjustable member 1004 is positioned on each of the left and right side of the adjustable chamber 1001. Accordingly, a fixed receiving area is not required as multiple dynamic receiving areas may be used instead. Further, at least one adjustable member 1004 may be additionally positioned on the top and/or bottom side of the adjustable chamber 1001 for additional pressure; in other words, a space between the top and/or bottom portion of the mobile computing device 402 may be removed for additional tightness. In addition, more or less flaps 1006 than those illustrated in FIG. 10 may be utilized in varying positions of the adjustable chamber 1001.

Figure 11:
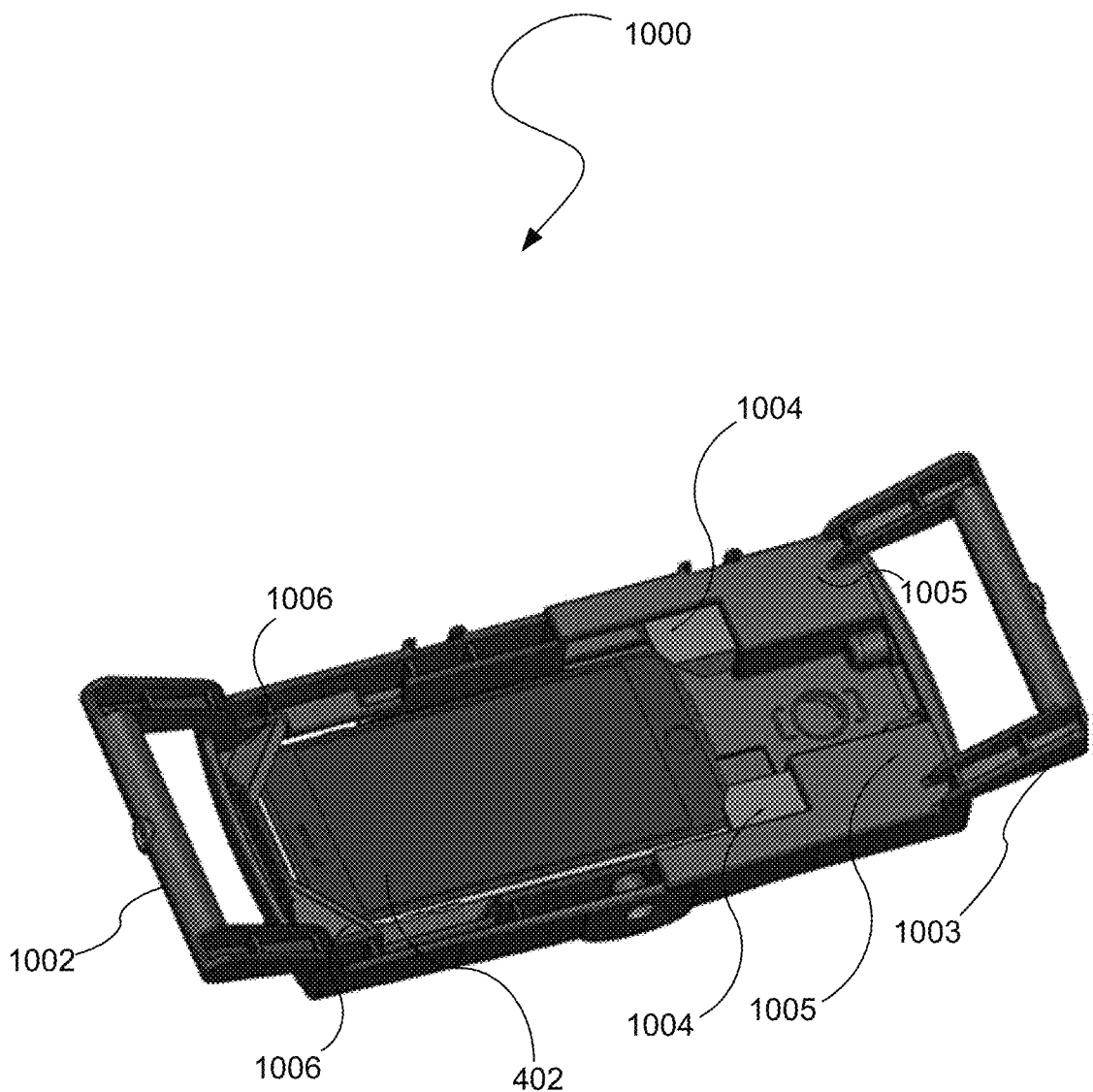
FIG. 11 illustrates a front perspective view of the apparatus illustrated in FIG. 10 with the mobile phone inserted into the apparatus.

FIG. 11 illustrates a front perspective view of the apparatus 1000 illustrated in FIG. 10 with the mobile phone 402 inserted into the apparatus 1000. The two adjustable members 1004 have been partially retracted into the member enclosures 1005 to accommodate the particular dimensions of the mobile phone 402. Further, in the illustrated example, only portions of edges of the adjustable members 1004—as opposed to the entirety of the edges—contact portions of edges of the mobile phone 402. Mobile phones of varying dimensions will have edges that occupy differing portions (possibly the entirety) of edges of the adjustable members 1004.

Figure 12:
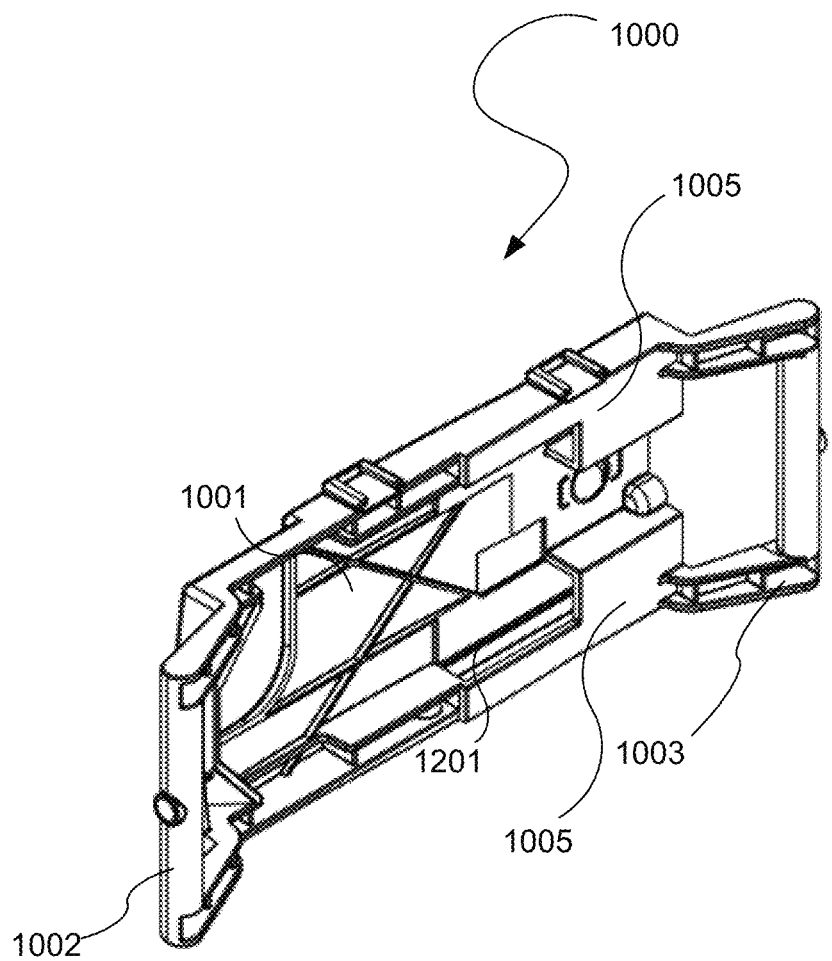
FIG. 12 illustrates an internal, front perspective view of the apparatus illustrated in FIG. 10 without the adjustable members.
Figure 13:
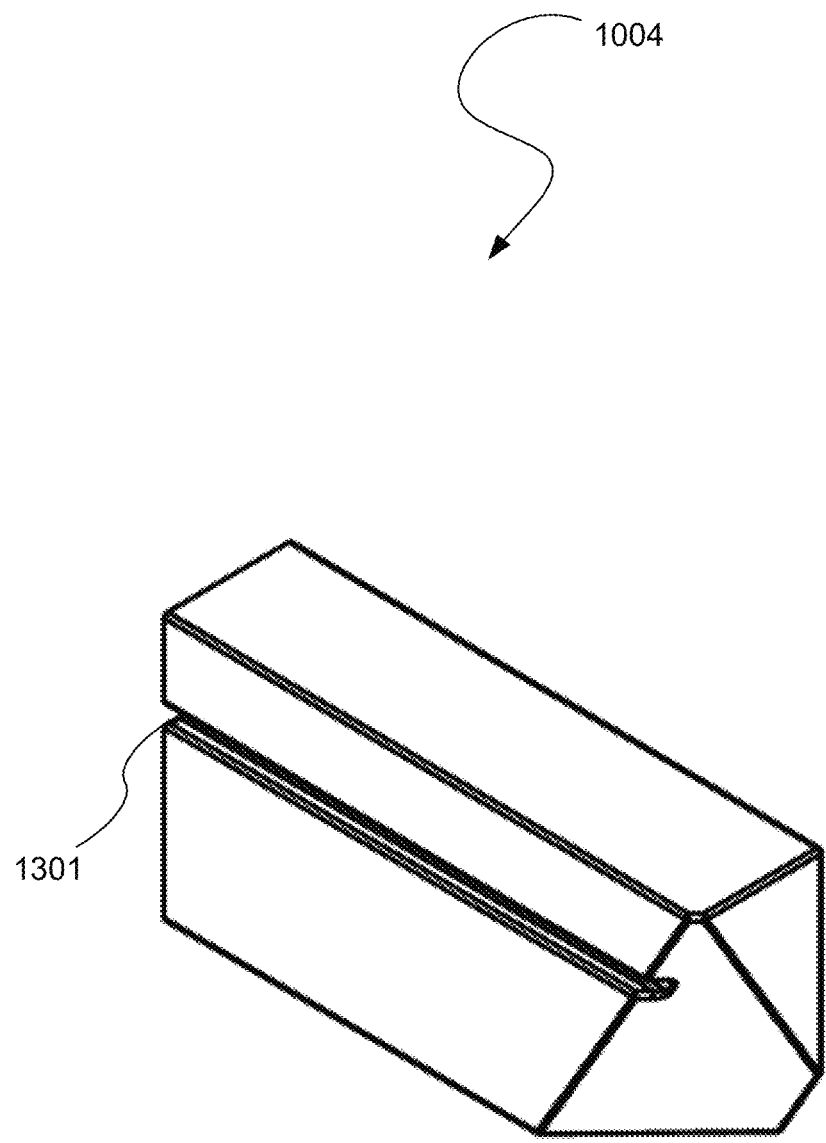
FIG. 13 illustrates a front perspective view of the adjustable member.

Further, FIG. 12 illustrates an internal, front perspective view of the apparatus 1000 illustrated in FIG. 10 without the adjustable members 1004 or the mobile phone 402. Accordingly, the member enclosures 1005 are illustrated as empty enclosures that may receive the adjustable members 1004. As an example, a sliding rail 1201, which may connect to a sliding groove 1301 (FIG. 13) of an adjustable member 1004 is illustrated. FIG. 13 illustrates a front perspective view of the adjustable member 1004. The sliding groove 1301, which receives the sliding rail 1201 of the member enclosure 1005, is illustrated. Alternatively, the member enclosure 1005 may have the sliding groove 1301, and the adjustable member 1004 may have the sliding rail 1201.

Figure 14:
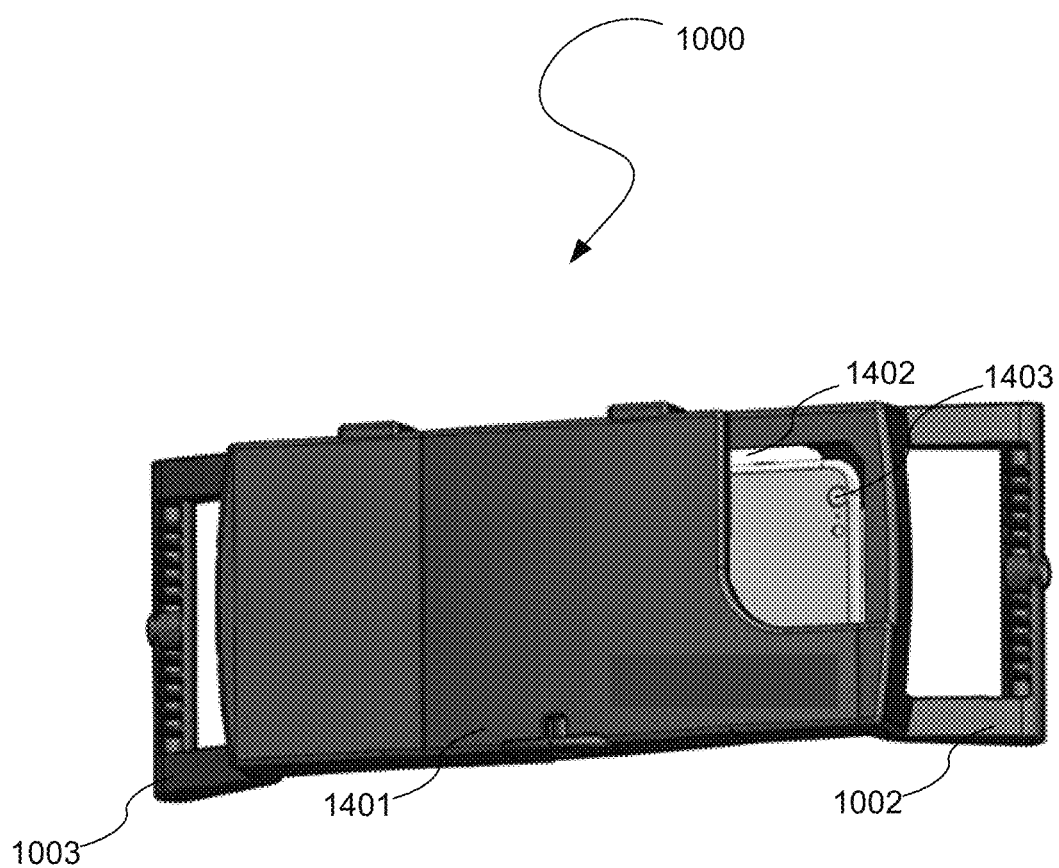
FIG. 14 illustrates a rear perspective view of the apparatus illustrated in FIG. 11 with the mobile phone inserted into the apparatus.

Additionally, FIG. 14 illustrates a rear perspective view of the apparatus 1000 illustrated in FIG. 11 with the mobile phone 402 inserted into the apparatus 1000. In one embodiment, the apparatus 1000 has a rear layer 1401 that has an aperture 1402 for an image capture lens 1403 of the mobile computing device 402. In one embodiment, the aperture 1402 is positioned directly to the rear of at least one of the flaps 1006 illustrated in FIG. 10. The aperture 1402 may also be positioned in a section of the rear layer 1401 other than the section having the member enclosures 1005 so that the aperture 1402 does not interfere with the connection of an adjustable member 1004 within a member enclosure 1005.

In one embodiment, the rear layer 1401 has different shapes corresponding to different portions of the front of the apparatus 1000 (e.g., a first shape corresponding to the portion of the apparatus 1000 that receives the mobile computing device 402, a second shape corresponding to a member enclosure 1005, etc.). In another embodiment, the rear layer 1401 has a flat shape irrespective of corresponding portions on the front of the apparatus 1000.

Figure 15:
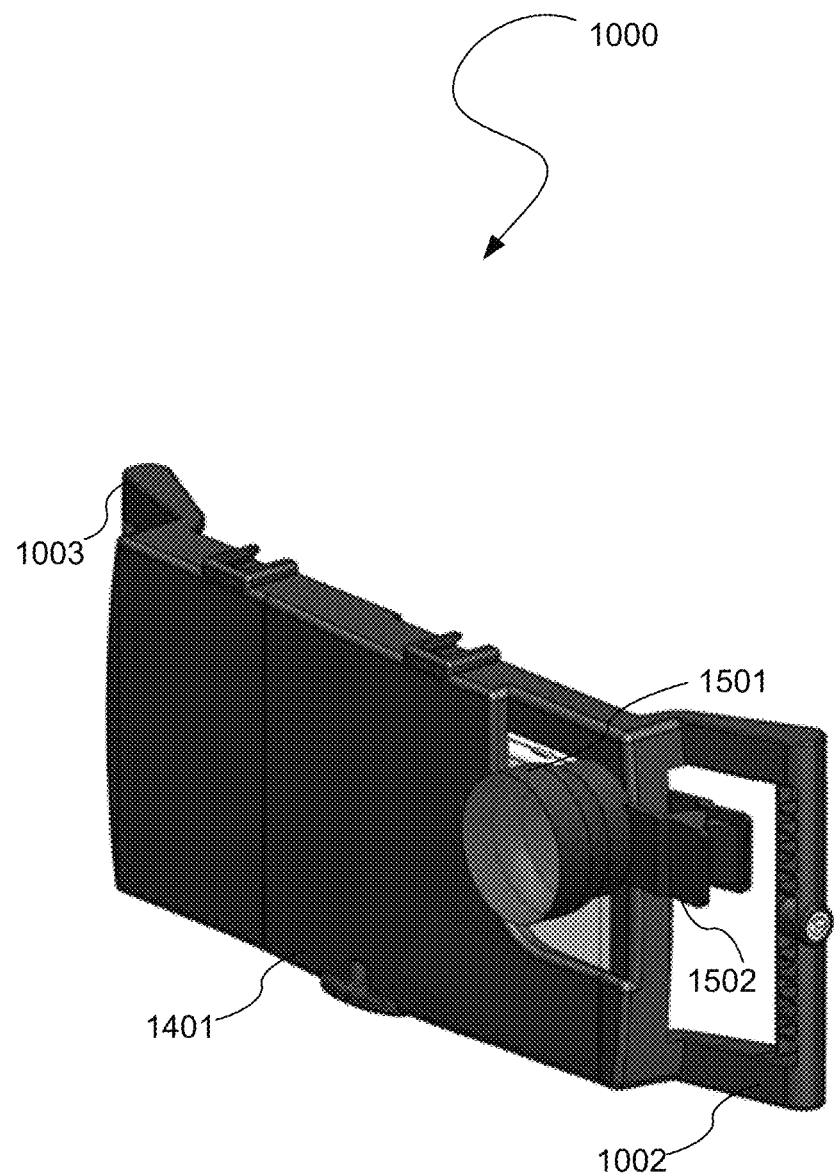
FIG. 15 illustrates a rear perspective view of the apparatus illustrated in FIG. 10 with an enhancement lens.

FIG. 15 illustrates a rear perspective view of the apparatus 1000 illustrated in FIG. 10 with an enhancement lens 1501. In one embodiment, the enhancement lens 1501 is operably attached to a portion of the apparatus 1000 that is situated to the left of the left handle 1002; in other words, the enhancement lens 1501 may be operably attached to the right edge (from the rear perspective) that abuts the portion of the apparatus 1000 at which the one or more flaps 1006 (or other retention mechanisms) are situated (as illustrated from the front perspective in FIG. 10). Alternatively, the enhancement lens 1501 may be operably attached to another edge that also abuts a portion of the apparatus 1000 at which the one or more flaps 1006 are situated. Alternatively, the enhancement lens 1501 may be operably attached to the left handle 1002, right handle 1003, or a portion of the apparatus 1000 abutting the member enclosure 1005.

A lens connector (e.g., clip, pin, bolt, etc.) 1502 may be used to adhere the enhancement lens 1501 to the apparatus 1000. The lens connector 1502 may be integrated within the apparatus 1000 or may be a detachable accessory.

Although the apparatus 1000 illustrated in FIGS. 10-15 is illustrated as receiving the mobile computing device 402, the apparatus 1000 may be configured to receive a case for the mobile computing device 402 instead. A variety of types of materials may be utilized for the apparatus 1000 and/or image capture computing device receptacles. For example, plastic, carbonite, metal, or the like may be utilized.

It is understood that the apparatuses described herein may also be applied in other types of apparatuses. Those skilled in the art will appreciate that the various adaptations and modifications of the embodiments of the apparatuses described herein may be configured without departing from the scope and spirit of the apparatuses. Therefore, it is to be understood that, within the scope of the appended claims, the present apparatuses may be practiced other than as specifically described herein.

We claim:

1. An apparatus comprising:
a left handle;
a right handle;

an adjustable chamber operably attached to the left handle and the right handle, the adjustable chamber receiving a mobile computing device that performs image capture;

one or more adjustable members positioned within the adjustable chamber, the one or more adjustable members horizontally retracting toward the left handle or the right handle based on contact between one or more edge portions of the mobile computing device and the one or more adjustable members so that the mobile computing device fits within the adjustable chamber; and one or more member enclosures positioned within the adjustable chamber, the one or more member enclosures receiving the one or more adjustable members during retraction, the one or more member enclosures having one or more slider rails that connect to the one or more adjustable members via one or more slider grooves.

2. The apparatus of claim 1, further comprising one or more flaps that retains the mobile computing device in a fixed position, the one or more flaps being positioned within the adjustable chamber at a distinct location from the one or more adjustable members.

3. The apparatus of claim 1, wherein the one or more member enclosures have one or more springs that connect to the one or more adjustable members.

4. The apparatus of claim 1, further comprising an enhancement lens that is operably attached to an edge of the adjustable chamber, the enhancement lens being positioned over an image capture device of the mobile computing device through an aperture within the adjustable chamber.

5. The apparatus of claim 1, further comprising an enhancement lens that is operably attached to the left handle.

6. The apparatus of claim 1, further comprising an enhancement lens that is operably attached to the right handle.

7. The apparatus of claim 1, wherein the mobile computing device is selected from the group consisting of a smartphone and a tablet device.

8. An apparatus comprising:
a handle;
an adjustable chamber operably attached to the handle, the adjustable chamber receiving a mobile computing device that performs image capture;
one or more adjustable members positioned within the adjustable chamber, the one or more adjustable members retracting toward the handle based on contact between one or more edge portions of the mobile computing device and the one or more adjustable members so that the mobile computing device fits within the adjustable chamber; and
one or more member enclosures positioned within the adjustable chamber, the one or more member enclosures receiving the one or more adjustable members during retraction, the one or more member enclosures having one or more slider rails that connect to the one or more adjustable members via one or more slider grooves.

9. The apparatus of claim 8, further comprising one or more flaps that retains the mobile computing device in a fixed position, the one or more flaps being positioned within the adjustable chamber at a distinct location from the one or more adjustable members.

10. The apparatus of claim 8, wherein the one or more member enclosures have one or more springs that connect to the one or more adjustable members.

11. The apparatus of claim 8, further comprising an enhancement lens that is operably attached to an edge of the adjustable chamber, the enhancement lens being positioned over an image capture device of the mobile computing device through an aperture within the adjustable chamber.

12. The apparatus of claim 8, further comprising an enhancement lens that is operably attached to the handle.

13. The apparatus of claim 8, wherein the mobile computing device is selected from the group consisting of a smartphone and a tablet device.

14. The apparatus of claim 8, wherein a rear portion of the adjustable chamber is flat.

15. An apparatus comprising:
a handle;
an adjustable chamber operably attached to the handle, the adjustable chamber receiving a mobile computing device that performs image capture;
one or more adjustable members positioned within the adjustable chamber, the one or more adjustable members retracting toward the handle based on contact between one or more edge portions of the mobile computing device and the one or more adjustable members so that the mobile computing device fits within the adjustable chamber; and
one or more member enclosures positioned within the adjustable chamber, the one or more member enclosures receiving the one or more adjustable members during retraction, the one or more member enclosures having one or more slider grooves that connect to the one or more adjustable members via one or more slider rails.

* * * * *